United States Patent [19]

Goodman

[11] Patent Number: 4,943,484
[45] Date of Patent: Jul. 24, 1990

[54] SOLAR CONTROL GLASS ASSEMBLY AND METHOD OF MAKING SAME

[75] Inventor: Ronald D. Goodman, Toledo, Ohio

[73] Assignee: Libbey-Owens-Ford Co., Toledo, Ohio

[21] Appl. No.: 223,681

[22] Filed: Jul. 25, 1988

Related U.S. Application Data

[63] Continuation of Ser. No. 898,098, Aug. 20, 1986, abandoned.

[51] Int. Cl.$^5$ ............................................. B32B 17/06
[52] U.S. Cl. ...................... 428/441; 428/212; 428/213; 428/426; 428/457; 428/469; 428/472; 428/480; 428/699; 428/701; 428/702; 428/913
[58] Field of Search .............. 428/701, 698, 699, 212, 428/213, 426, 441, 457, 469, 472, 480, 702, 913

[56] References Cited

U.S. PATENT DOCUMENTS

| | | | |
|---|---|---|---|
| 3,649,359 | 3/1972 | Apfel et al. | 428/701 X |
| 3,853,386 | 12/1974 | Ritter et al. | 428/701 X |
| 3,889,026 | 6/1975 | Groth | 428/437 |
| 3,949,134 | 4/1976 | Willdorf | 428/441 |
| 4,017,661 | 4/1977 | Gillery | 428/430 |
| 4,382,995 | 5/1983 | Lin | 428/437 |
| 4,581,280 | 4/1986 | Taguchi et al. | 428/701 X |
| 4,622,120 | 11/1986 | Gillery | 428/701 X |
| 4,628,005 | 12/1986 | Ito et al. | 428/701 X |
| 4,702,955 | 10/1987 | Allred et al. | 428/701 X |

FOREIGN PATENT DOCUMENTS

| | | | |
|---|---|---|---|
| 0724102 | 12/1965 | Canada | 428/430 |
| 0077672 | 4/1983 | European Pat. Off. | 428/430 |
| 0003053 | 1/1984 | Japan | 428/430 |
| 1219630 | 1/1971 | United Kingdom | 428/430 |
| 2057355 | 5/1981 | United Kingdom | 428/437 |
| 2134444 | 8/1983 | United Kingdom | 428/433 |

Primary Examiner—Thurman K. Page
Assistant Examiner—Archene A. Turner
Attorney, Agent, or Firm—Marshall & Melhorn

[57] ABSTRACT

A glass assembly includes a glass substrate having an induced transmission filter adhered to one surface thereof. The filter includes at least one coating formed of a layer of reflective material between two layers of dielectric material. The reflective material can be one of aluminum, silver, gold and copper. The dielectric material can be one of zinc oxide, indium oxide, titanium dioxide and tin oxide. The coating can be applied to one side of a plastic carrier sheet and an abrasion resistant material can be applied to the other side of the carrier sheet to form a film. The film can be adhered directly to the glass or to an intermediate plastic sheet. In an alternate embodiment, the coating can be applied to a surface of a glass sheet and covered with an abrasion resistant material which can be another sheet of glass.

7 Claims, 1 Drawing Sheet

SOLAR CONTROL GLASS ASSEMBLY AND METHOD OF MAKING SAME

BACKGROUND OF THE INVENTION

This application is a continuation of Ser. No. 06/898,098, filed 8/20/86, now abandoned.

The present invention concerns glass structures for controlling the transmission of solar energy in general and, in particular, to automotive glass for transmitting light in the visible spectrum while blocking solar radiation outside the visible spectrum.

Two methods, or some combination thereof, are generally utilized to reduce the transmission of solar energy through glass. The first method is absorption wherein the solar energy outside of a particular bandwidth is absorbed by predetermined elements in the glass and reradiated as heat. For example, U.S. Pat. No. 2,860,059 discloses a light absorbing glass suitable for automotive and architectural glazing applications. In a laminated automotive windshield in which two sheets of glass are bonded to an intermediate layer of polyvinyl butyral resin, the plastic layer is provided with a colored band extending across the upper portion of the windshield which band gradually decreases in light transmittance to provide a built-in glare screen for the windshield. An ultraviolet light absorbing glass is provided at least for the outer glass sheet to protect the colored band from fading and other injurious effects of the sun. The glass is ordinary soda-lime-silica glass to which ultraviolet cut-off materials such as ceric oxide and titanium dioxide combined with ferric oxide are added.

It is important that automotive glass have a low total solar transmission with relatively high transmission in the visible spectrum. Federal standards require the Illuminant A value of automotive glass to be at least seventy percent of the value of clear glazed glass at a one quarter inch thickness in the visible spectrum (wavelengths of 400-700 millimicrons). This requirement insures that the driver will have sufficient transmission through the glass to be able to contrast an automobile headlight and other sources of light from the background.

Since it is also desirable to block infrared radiation, much work has been done on automotive glass which blocks the solar transmission on both ends of the visible spectrum. The Federal Illuminant A standard is at least seventy percent transmittance in the visible spectrum at one quarter inch thickness. To be considered to be a heat absorbing glass, the total solar transmittance must be below fifty percent at the same thickness. One method of manufacturing heat absorbing glass is to incorporate iron and tin in the glass and maintain during the glass melting, refining and reforming period at least eighty percent of the iron in the glass in the ferrous state. Furthermore, sufficient tin must be maintained in the stannous state to act as an internal reducing agent to prevent additional oxidation of the ferrous iron to ferric species in a subsequent glass reheating step.

By introducing other infrared absorbing compounds into the glass batch materials, radiation at the infrared end of the spectrum could be absorbed while producing an automotive glass which would meet the Illuminate A standards. The other method of reducing the solar transmission is reflection. A reflecting material such as silver is coated directly on the surface of the glass or onto the surface of a plastic sheet which is then adhered to the glass.

The addition of tin oxide can lower the transmission of basic automotive glass. However, this technique produces only marginal solar gain since the absorbed energy can be reradiated both to the outside and inside of the vehicle. Reradiated energy to the inside of the vehicle becomes a solar gain which is added to the direct solar gain that passes through the glass unabsorbed. As the amount of glass sheet used in vehicles increases, the solar gain will also increase placing an increased strain on air conditioning systems.

A better approach is to increase the total solar reflection of the glass by the addition of coatings applied directly to the glass or to a carrier film such as polyester which can be applied to the glass. Light from the sun, which is reflected and not absorbed, is not a gain to the car since it is not transformed into heat but remains as light. The other advantage of a reflecting coating over an absorbing glass is that the reflective coating maintains an increasing edge over the absorbing glass as the wind becomes lower and lower. The glass temperature for an absorbing glass increases with lower wind speed and therefore loses more energy to the inside of the car.

SUMMARY OF THE INVENTION

The present invention utilizes an induced transmission filter combined with automotive glass to achieve improved filtering characteristics of glass to solar gain. The filter maintains high transmission over the visible part of the solar spectrum and also has high reflection over the infrared part. The filter includes a stack of coatings which are applied to one side of a polyester film with a hardcoat applied to the other side of the film. The coatings face the inside surface of the glass and the hardcoat faces the inside of the car to prevent damage to the coatings and film during normal use. An additional film of polyester can be applied to the surface of the coatings where certain types of adhesives are utilized to attach the film to the glass.

A glass assembly according to the present invention which provides improved resistance to solar transmission and meets the Federal Illuminant A standards consists of a PET carrier film having an abrasion resistant coating or hardcoat on one side and layers of a reflective coating on the other side. Each of the layers of reflective coating is a sandwich of a layer of metallic film between two layers of dielectric coatings. For example, the metallic film can be a layer of silver and the dielectric coatings can be layers of zinc oxide. Such a construction is applied to a layer of polyvinyl butyral on the inside of a glass substrate such as a single sheet of glass or a laminated windshield having two layers of glass with a layer of polyvinyl butyral in between. The two reflective coating layers provide significantly better resistance to solar transmission than one layer and still meet the Illuminant A standards.

The film is applied to the glass by either adhering it to a layer of polyvinyl butyral which is then applied to the glass, or by utilizing a pressure sensitive adhesive, or by utilizing a water-activated adhesive. In the latter case, a polyester protective sheet is utilized between the adhesive and the reflective coating.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENTS

Figure 1:
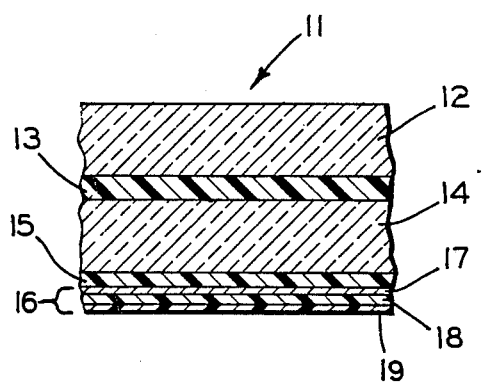
FIG. 1 is a fragmentary cross-sectional view of a laminated glass assembly including a film for controlling solar gain according to the present invention.

Referring to FIG. 1, there is shown a glass assembly 11 according to the present invention. The assembly 11 can be, for example, a laminated vehicle windshield including an outer layer of clear glass 12 and intermediate layer 13 of polyvinyl butyral and an inner layer 14 of clear glass. The glass assembly 11 can be of the anti-lacerative type which includes a protective layer 15 of polyvinyl butyral adhered to an inner surface of the inner layer 14 of glass.

The glass assembly 11 also includes an induced transmission filter formed as a film 16 adhered to an inner surface of the protective layer 15. The film 16 consists of a coating 17 closest to the protective layer 15, an intermediate carrier 18 formed of a plastic material such as polyester, and a protective layer of hardcoat 19 which is substantially abrasion resistant. The intermediate layer 18 can be, for example, formed of polyethylene terephthalate. The coating 17 is a reflective material which tends to reflect the ultraviolet and infrared wave lengths of solar radiation back out through the polyvinyl butyral layers 13 and 15 and the glass layers 12 and 14. Thus, the assembly has reduced solar gain to the interior of the vehicle and also meets the Federal Illuminant A standards.

Figure 2:
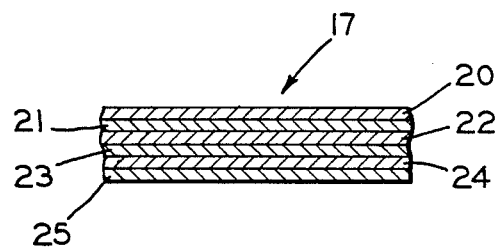
FIG. 2 is a fragmentary cross-sectional enlarged view of the coating layer of FIG. 1.

There is shown in FIG. 2 an enlarged fragmentary cross-sectional view of the coating 17. The coating is a sandwich of a reflective metallic material between two layers of dielectric material. For example, the coating 17 can include a first layer 20 of zinc oxide, a second or intermediate layer 21 of silver, and a third layer 22 of zinc oxide. The order of the layers is then repeated with a fourth layer 23 of zinc oxide, a fifth layer 24 of silver and a sixth layer 25 of zinc oxide. The layers 20 through 25 are applied to the outwardly facing surface of the carrier 18 before being attached to the protective layer 15.

Other materials are suitable for use in the coating 17. For example, the dielectric material can be titanium dioxide or indium or tin oxide. The reflective metallic material can be gold or aluminum or copper. Typically, the total thickness of the two dielectric layers and the one reflective layer is in the range of two hundred twenty-five to one thousand two hundred fifty angstroms. The reflective layer can be from twenty-five to two hundred fifty angstroms and each dielectric layer can be from one hundred to five hundred angstroms.

Figure 3:
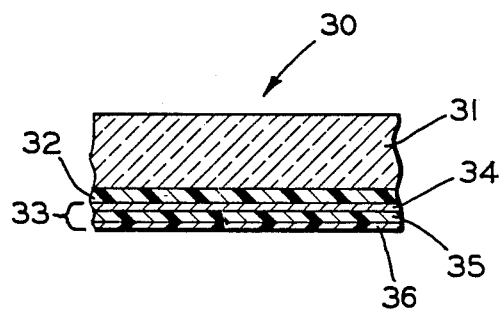
FIG. 3 is a fragmentary cross-sectional view of an alternate embodiment of a glass assembly according to the present invention.

There is shown in FIG. 3 a fragmentary cross-sectional view of a glass assembly 30 according to an alternate embodiment of the glass assembly 11 of FIGS. 1 and 2. A glass sheet substrate 31 has an attaching layer 32 formed on its inner surface. The attaching layer 32 can be polyvinyl butyral or some form of adhesive structure utilizing a pressure sensitive adhesive or a water-activated adhesive. The attaching layer 32 connects a film 33 with the glass sheet 31. The film 33 can consist of a coating layer 34, a carrier layer 35, and a hardcoat 36. Thus, the film 33 is similar to the film 16 shown in FIG. 1.

Figure 4:
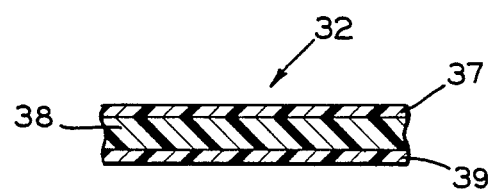
FIG. 4 is an enlarged view of the attaching layer shown in FIG. 3 according to the present invention.

The attaching layer 32 is shown in more detail in FIG. 4. A layer 37 of water-activated adhesive is applied to one side of a carrier layer 38 of a plastic material such as polyester which faces the substrate 31. A layer 39 of pressure sensitive adhesive is applied to the opposite side of the carrier 38 which faces the coating layer 34. Pressure sensitive adhesive can be substituted for the water-activated adhesive in the layer 37, or the layers 37 and 38 can be eliminated such that the layer 39 of pressure sensitive adhesive is the attaching layer 32.

Figure 5:
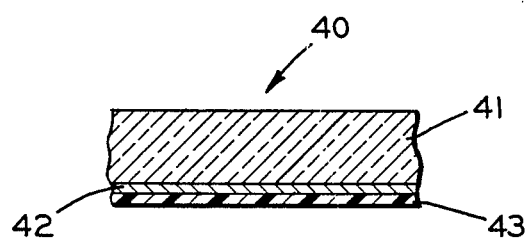
FIG. 5 is a fragmentary cross-sectional view of a second alternate embodiment of a glass assembly according to the present invention.

There is shown in FIG. 5 a fragmentary cross-sectional view of a second alternate embodiment of a glass assembly 40. A sheet of glass 41 has a coating 42 adhered to an inner surface thereof. The coating 42 is then covered by an abrasion resistant layer 43. The layer 43 can be a hardcoat or a polyvinyl butyral material.

Although shown as a laminated glass structure, the glass assembly 11 of FIG. 1 could be a side light or a back light which typically are formed of a single layer of glass. Thus, the outer layer 12 and the intermediate layer 13 could be eliminated. Similarly, the glass assembly of FIG. 3 and the glass assembly 40 of FIG. 4 are shown with single glass sheets. They could also be formed as laminated glass structures by adding an intermediate layer such as the polyvinyl butyral layer 13 and an outer layer such as the glass layer 12 of FIG. 1. Thus, the solar control glass assemblies shown in the figures and described above could be utilized in every window in a vehicle.

A glass assembly of the type shown in FIG. 1 having two coatings of the zinc oxide and silver combination has been found to meet the Federal Illuminant A standards of at least 70% in the visible spectrum. Such a glass assembly has a total solar transmission of less than 40%, and total solar reflection greater than 25%. The coating configuration shown in FIG. 2 has been found to be the most suitable for reducing solar gain and meeting the Federal Illuminant standard. A single set of filter layers does not provide enough reduction in solar transmission to meet the solar gain requirements demanded by the automobile industry.

Figure 6:
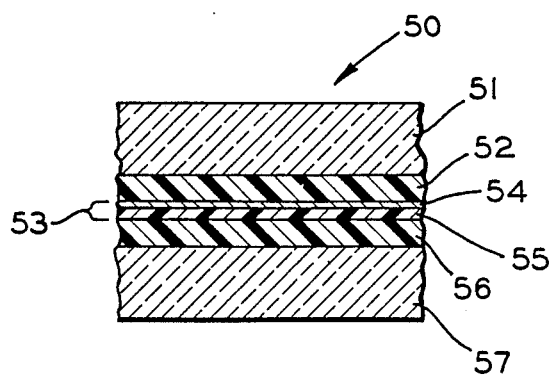
FIG. 6 is a fragmentary cross-sectional view of a third alternate embodiment of a glass assembly according to the present invention.

FIG. 6 is a fragmentary cross-sectional view of a third alternate embodiment of a glass assembly 50. A sheet of glass 51 has a layer 52 of polyvinyl butyral or similar material adhered to its inner surface. The next layer 53 is a film formed of a coating layer 54 and a carrier layer 55. The assembly 50 is completed with a second layer 56 of polyvinyl butyral and an outer layer of glass 57. The layers 56 and 57 replace the abrasion resistant layers in the first two embodiments.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A solar control glass assembly, comprising:
   A) a glass substrate having a surface:
   B) a first attaching layer adhered to the surface of the glass substrate, comprising a carrier layer of a plastic material coated on a first surface thereof with a pressure sensitive adhesive and on a second surface thereof with a water activated adhesive;
   C) an induced transmission filter adhered to the attaching layer, comprising a first layer of a dielectric material, a second layer of a reflective material, third and fourth layers of a dielectric material, a fifth layer of a reflective material, and a sixth layer of a dielectric material;
   D) a layer of polyester adhered to the induced transmission filter; and
   E) a layer of an abrasion resistant material adhered to the layer of polyester.

2. The solar control glass assembly according to claim 1, wherein the dielectric material is zinc oxide.

3. The solar control glass assembly according to claim 1, wherein the reflective material is silver.

4. The solar control glass assembly according to claim 1, wherein the layers of reflective material are each, independently from about 25 to about 250 Angstroms thick.

5. The solar control glass assembly according to claim 1, wherein the layers of dielectric material are each, independently from about 100 to about 500 Angstroms thick.

6. The solar control glass assembly according to claim 1, wherein the Illuminant A transmittance through the assembly is greater than 70% and the total solar energy transmittance through the assembly is less than 55%.

7. A solar control glass assembly, comprising:
   A) a glass substrate having a surface;
   B) a first attaching layer adhered to the surface of the glass substrate, comprising a carrier layer of a plastic material coated on a first surface thereof with a pressure sensitive adhesive and on a second surface thereof with a water activated adhesive;
   C) an induced transmission filter adhered to the attaching layer, comprising a first layer of zinc oxide, a second layer of silver, third and fourth layers of zinc oxide, a fifth layer of silver, and a sixth layer of zinc oxide, the silver layers each, independently having a thickness from about 25 to about 250 Angstroms, and the zinc oxide layers each, independently having a thickness from about 100 to about 500 Angstroms;
   D) a layer of polyester adhered to the induced transmission filter; and
   E) a layer of an abrasion resistant material adhered to the layer of polyester;
wherein the Illuminant A transmittance through the assembly is greater than 70% and the total solar energy transmittance through the assembly is less than 55%.

* * * * *